Figure 1:
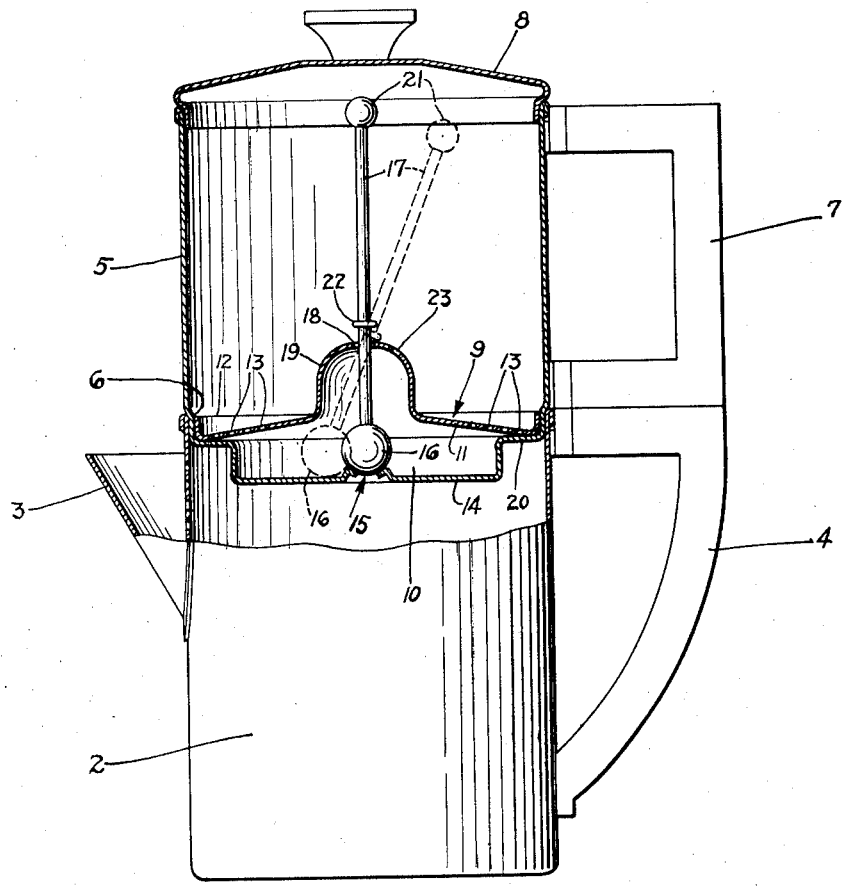

June 12, 1934.   R. FERRIS   1,962,493

COFFEE MAKING APPARATUS

Filed June 2, 1933

Inventor
ROBERT FERRIS
By Paul, Paul & Moore
ATTORNEYS

Patented June 12, 1934

1,962,493

UNITED STATES PATENT OFFICE 1,962,493

COFFEE MAKING APPARATUS

Robert Ferris, Minneapolis, Minn.

Application June 2, 1933, Serial No. 673,941

8 Claims. (Cl. 53—3)

This invention relates to new and useful improvements in coffee making apparatus and contemplates the provision of such an apparatus of simple and inexpensive construction, which comprises few parts, and is particularly well adapted for making steeped coffee.

An object of the invention is to provide a coffee making apparatus comprising a lower receptacle having an open top, and a container adapted to be supported on said receptacle and having a filtering member removably supported therein adapted to secure the fresh ground coffee, and a suitable discharge opening being provided in the bottom wall of the container having a valve whereby the liquid coffee in the container may be discharged therefrom into the receptacle when ready to be consumed.

Another object is to provide a container and associated valve mechanism of the aforementioned character, wherein means are provided for holding the valve off its seat once it has been tripped, so that the liquid passing from the container through the discharge opening and into the lower receptacle cannot reseat the valve and stop the flow thereof.

A further object is to provide a coffee making apparatus comprising a container having a filtering member removably mounted in the lower portion thereof adapted to receive the ground coffee, and said filtering member having a stem movably and inseparably supported therein and provided at its lower end with a valve adapted to close a discharge opening in the bottom of the container, said stem functioning as a means for actuating said valve, and also as a means for lifting the filtering member out of the container for cleaning and other purposes.

A further object resides in the novel construction of the filtering member which also provides the supporting means for the valve stem, and has its central portion raised to provide a dome, the upper wall of which is spaced a considerable distance above the valve opening or seat provided in the bottom wall of the container, and said upper dome wall having a guide opening therein for the valve stem, which acts as a fulcrum for said stem, when lateral pressure is applied to the upper portion of the stem, thereby causing the stem to relatively tilt with the resultant unseating of the valve.

A further object is to provide a coffee making apparatus which is an improvement over the form shown in my pending application, Serial No. 664,946, filed April 7, 1933.

Other objects of the invention will appear from the following description and accompanying drawing and will be pointed out in the annexed claims.

In the accompanying drawing, there has been disclosed a structure designed to carry out the various objects of the invention, but it is to be understood that the invention is not confined to the exact features shown as various changes may be made within the scope of the claims which follow.

Figure 2:
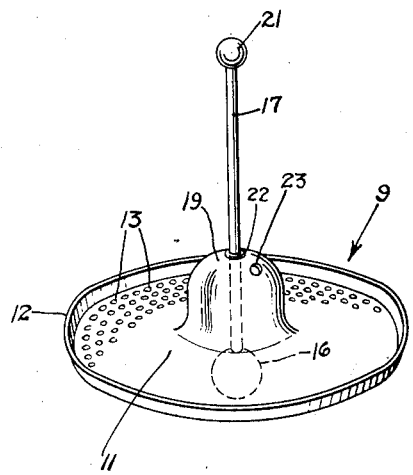

In the drawing:

Figure 1 is an elevational view of my improved coffee making apparatus partially broken away to show the interior construction thereof; and Figure 2 is a perspective view of the filtering member removed from the container.

The novel coffee making apparatus herein disclosed comprises a lower receptacle 2 having an open top, and provided with a pouring spout 3 and a suitable handle 4. A container 5 is shown having a reduced portion 6 adapted to be fitted into the open top or mouth of the receptacle 2, whereby the container may be removably supported thereon. The container 5 is provided with a suitable handle 7 and has a detachable cover or closure 8.

The apparatus herein disclosed is particularly well suited for brewing coffee or tea by steeping, a predetermined quantity of ground coffee or tea being placed in the container together with boiling water, and allowed to steep therein until the brewed beverage attains the desired strength, after which the finished beverage is discharged into the receptacle 2 from the container.

An important feature of the present invention resides in the construction of the filtering member provided in the container, and also the means provided therein for transferring the brewed or steeped liquid coffee from the container 5 into the receptacle 2. The filtering member is generally indicated by the numeral 9, and comprises a disk-like portion 11, preferably shaped as shown in Figure 1, and having an annular up-turned flange 12 at its periphery. The filtering member is shown supported on an annular seat 20 in the lower portion of the container 5, whereby the bottom wall 14 of the container is spaced from the filtering member 9 and cooperates therewith to provide a chamber 10. A plurality of apertures 13 are provided in the portion 11 of the filtering member through which the steeped beverage may drain or filter from the container 5.

The bottom wall 14 of the container 5 has a discharge opening 15 adapted to be closed by a suitable valve 16, here shown as being spherical in configuration. It will be noted that the walls defining the discharge opening 15 extend upwardly above the plane of the bottom 14 of the container and thereby form a barrier for the valve 16 once it has been unseated. In other words, the flow of liquid from container 5 through opening 15 into receptacle 2 cannot reseat the valve and stop the flow thereof, nor can the flow be interfered with by partial closing of the valve. The valve 16 has a stem 17 slidably supported in a suitable aperture 18 provided in the upper wall of a centrally disposed dome-like portion 19 of the filtering member 9. A suitable finger grip 21 may be provided at the upper end of the stem 17, whereby the latter may be conveniently manipulated to open or close the valve 16, as shown in full and dotted lines in Figure 1. In this figure it will be noted that the wall of the guide aperture 18 in the dome 19 functions as a fulcrum for the valve stem 17, when pressure is applied to the upper end thereof to tilt it into valve opening position. By this arrangement, the operation of opening the valve is greatly facilitated, and it is not necessary to touch the hot valve stem with the fingers, as it may readily be tilted by simply pushing it over with the edge of the cover 8, when the latter is removed from the container. An annular collar or shoulder 22 is provided on the stem 17 to limit its sliding movement in the aperture 18 of the dome 19. A suitable vent hole 23 is provided in the upper portion of the dome 19 to permit free circulation of air into and out of the chamber 10, when the apparatus is operated.

In the operation of this novel apparatus, a predetermined quantity of ground coffee is introduced into the container 5 upon the filtering member 9, and a predetermined quantity of boiling water is then poured into the container and allowed to remain therein until the coffee has steeped sufficiently to produce a beverage of the desired strength. During this part of the operation, the valve 16 is closed, as shown in the full line position in Figure 1. When the coffee has steeped sufficiently in the container, the valve 16 is opened by tilting the stem 17 to one side, as indicated by the dotted lines in Figure 1, whereupon the discharge aperture 15 in the bottom of the container is opened to allow the brewed coffee to discharge from the container into the receptacle 2, as will readily be understood. After all of the beverage has drained from the container 5 into the receptacle, the container may be removed from the receptacle. When the container is thus removed from the receptacle, the closure 8 may be seated directly upon the open top of the receptacle to thereby render the receptacle more convenient to handle.

The filtering member may readily be removed from the container for cleaning and other purposes by simply lifting it from the container by means of the stem 17 of the valve. Such removal of the filtering member from the container will also result in the removal of the coffee grounds therefrom, as the latter is supported directly upon the filtering member. The stem 17 is inseparably connected to the filtering member so that it cannot become detached therefrom when the filtering member is removed from the container. It will thus be seen that the apparatus is very simple in construction and is exceedingly simple to operate, and the strength of the resultant beverage may be varied, as desired, by varying the time that the coffee is allowed to steep in the container 5. The apparatus is therefore very economical in the use of coffee as substantially all of the strength in the coffee grounds may be extracted therefrom.

I claim as my invention:

1. In an apparatus of the class described, a container provided with a discharge opening, a filtering member in the container, a valve controlling liquid flow through said discharge opening, an operating member for said valve mounted for universal movement in said filtering member, and means for preventing the valve from reseating itself due to the flow of liquid through said discharge opening.

2. In an apparatus of the class described, a receptacle, a container provided with a discharge opening, a perforated member in the container, a stem movably supported in said member, a valve secured to said stem for controlling liquid flow through said discharge opening, means necessitating that said stem be tilted to an inclined position to unseat the valve, and means adjacent said valve and discharge opening for preventing the valve from reseating itself due to the flow of liquid through said discharge opening.

3. In an apparatus of the class described, a receptacle, a container having a discharge opening in its bottom wall, a filtering member in the container having a raised central portion provided with a guide aperture in its upper wall, a stem movably supported in said guide aperture, a valve secured to said stem below said raised portion for controlling liquid flow through said discharge opening, the wall of said guide aperture acting as a fulcrum for the valve stem whereby the latter may be tilted to unseat the valve, said valve being adapted to rest on the bottom wall of said container when unseated, and means for preventing the valve from reseating itself due to the flow of liquid through said discharge opening.

4. In an apparatus of the class described, a receptacle, a container adapted to be supported thereon and having a discharge opening in its bottom wall, the walls defining said discharge opening extending above the plane of said bottom wall to form a barrier, a perforated member removably supported in the container and having a stem slidably and inseparably supported therein, a valve secured to said stem and operable thereby to control liquid flow through said discharge opening, and means necessitating that said stem be tilted to unseat the valve, said valve when unseated being prevented by said barrier from reseating itself due to the liquid flow through said discharge opening.

5. In an apparatus of the class described, a container provided with a discharge opening, a filtering member in the container, a valve for controlling the liquid flow through said discharge opening, and a valve stem connected to said valve, said valve stem serving as an operating member to move said valve laterally from said discharge opening to open the same, and means for preventing the valve from reseating itself due to the flow of liquid through said discharge opening.

6. In a coffee making apparatus, a receptacle, a container adapted to be supported thereon and having a discharge opening in its bottom wall, a perforated member removably supported in the container and adapted to support the ground coffee, a valve for said discharge opening provided with a stem, and a guide for said stem engaging an intermediate portion thereof, said stem being movable laterally from a vertical position to an inclined position with the valve resting on the bottom wall of said container thereby opening said discharge opening and permitting the steeped coffee in the container to discharge into the receptacle, and means for preventing the valve from reseating itself due to the flow of liquid through said discharge opening.

7. In an apparatus of the class described, a receptacle, a container having a discharge opening in its bottom wall, a filtering member in the container having a raised central portion provided with a guide aperture in its upper wall, a stem movably supported in said aperture and having a portion extending above and below the upper wall of said raised portion, the portion of said stem extending above said upper wall being longer than the portion extending below said upper wall, and a valve secured to said stem below said raised portion for controlling liquid flow through said discharge opening, the wall of said guide aperture acting as a fulcrum for the valve stem whereby the latter may be moved laterally to unseat the valve.

8. A filtering member for coffee pots of the type wherein the coffee is steeped in a container and then discharged through a valve controlled opening into a receptacle, said filtering member having a raised central portion provided with a guide aperture, a valve stem movably supported in said aperture, a valve carried by said stem, the wall of said guide aperture acting as a fulcrum for the valve stem whereby the latter may be moved laterally to unseat the valve, and means normally preventing disengagement of said valve stem from said filtering member, said filtering member and valve stem being removable as a unit from said container.

ROBERT FERRIS.